United States Patent
Kim et al.

(10) Patent No.: US 12,455,374 B2
(45) Date of Patent: Oct. 28, 2025

(54) DISTANCE MEASUREMENT SYSTEM

(71) Applicant: SENSORTEC CO., LTD, Bucheon-si (KR)

(72) Inventors: Hong Kuk Kim, Goyang-si (KR); Kyu Ho Chin, Seoul (KR); Han Seok Choi, Gimpo-si (KR)

(73) Assignee: SENSORTEC CO., LTD., Bucheon-si (KR)

( * ) Notice: Subject to any disclaimer, the term of this patent is extended or adjusted under 35 U.S.C. 154(b) by 51 days.

(21) Appl. No.: 18/548,218

(22) PCT Filed: Jun. 30, 2022

(86) PCT No.: PCT/KR2022/009381
§ 371 (c)(1),
(2) Date: Aug. 28, 2023

(87) PCT Pub. No.: WO2023/287072
PCT Pub. Date: Jan. 19, 2023

(65) Prior Publication Data
US 2024/0142616 A1    May 2, 2024

(30) Foreign Application Priority Data
Jul. 16, 2021  (KR) ........................ 10-2021-0093189

(51) Int. Cl.
*G01S 15/10*    (2006.01)
*G01S 7/526*    (2006.01)

(52) U.S. Cl.
CPC .............. *G01S 15/10* (2013.01); *G01S 7/526* (2013.01)

(58) Field of Classification Search
CPC ............ G01S 15/10; G01S 7/526; G01S 7/527
See application file for complete search history.

(56) References Cited

U.S. PATENT DOCUMENTS

| | | | |
|---|---|---|---|
| 5,923,282 A | 7/1999 | Honma et al. | |
| 10,663,583 B2 | 5/2020 | Lee | |
| 2024/0142616 A1* | 5/2024 | Kim | ........................ G01S 15/10 |

FOREIGN PATENT DOCUMENTS

| | | | |
|---|---|---|---|
| CN | 115736854 A | * | 3/2023 |
| CN | 117392318 A | * | 1/2024 |
| CN | 118695218 B | * | 12/2024 |
| CN | 119087454 A | * | 12/2024 |
| JP | 11-064497 A | | 3/1999 |

(Continued)

OTHER PUBLICATIONS

Translation of KR-20180064709 (Year: 2018).*

*Primary Examiner* — Daniel Pihulic
(74) *Attorney, Agent, or Firm* — YOU & IP, LLC (57) ABSTRACT

The present invention relates to a distance measurement system comprising: a sensor unit for generating and transmitting a signal and receiving a reflected signal reflected back from an object; a buffer for temporarily storing data; and a control unit which calculates the distance to the object by measuring the time from when the signal is transmitted from the sensor unit to when the reflected signal is received. According to the present invention, the proposed distance measurement system uses an algorithm combining probability and moving average, thus having the effect of significantly improving the reliability of distance measurement compared to existing modes of distance detection.

5 Claims, 10 Drawing Sheets

(56) References Cited

FOREIGN PATENT DOCUMENTS

| | | | | |
|---|---|---|---|---|
| JP | 2013-033024 A | | 2/2013 | |
| KR | 20180064709 A | * | 6/2018 | ............... G01C 3/02 |
| KR | 10-2018-0110909 A | | 10/2018 | |
| KR | 10-2018-0127119 A | | 11/2018 | |
| KR | 2018127119 A | * | 11/2018 | ............. G01S 15/08 |
| KR | 10-2019-0115180 A | | 10/2019 | |
| KR | 10-2386499 B1 | | 4/2022 | |
| WO | WO-2023287072 A1 | * | 1/2023 | ............. G01S 15/10 |
| WO | WO-2023032567 A1 | * | 3/2023 | ............. G01S 15/46 |

* cited by examiner

DISTANCE MEASUREMENT SYSTEM

TECHNICAL FIELD

The present disclosure relates to a distance measurement system that measures the distance to an object within a certain range using a signal generated by a sensor and a reflected wave.

BACKGROUND ART

Figure 1:
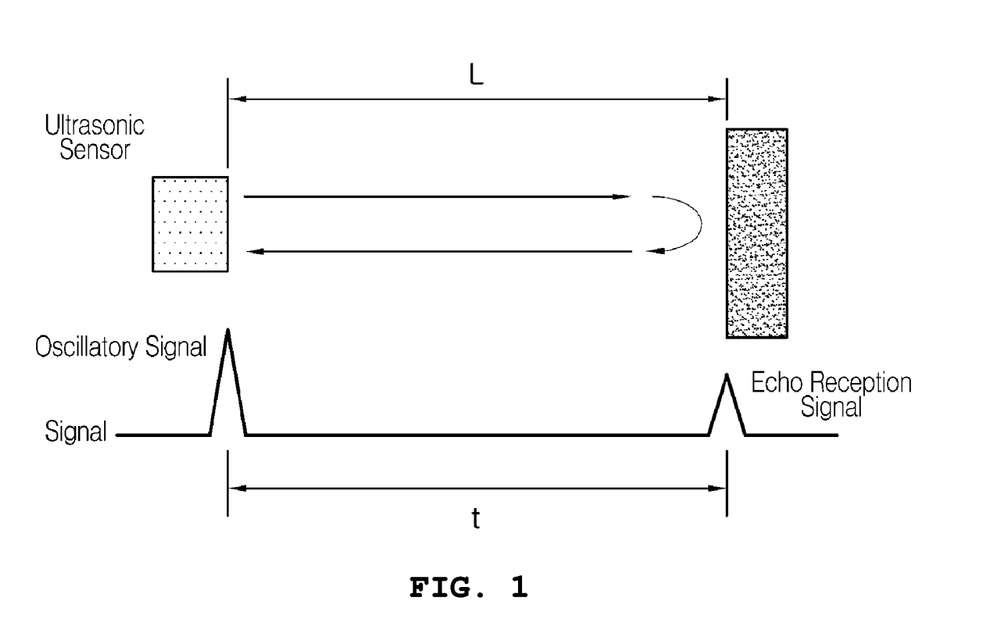
FIG. 1 is a view illustrating a method of calculating a distance using an ultrasonic sensor.

FIG. 1 is a view illustrating a method of calculating a distance using an ultrasonic sensor.

Referring to FIG. 1, the ultrasonic sensor emits ultrasonic waves to an object to be measured separated by a certain distance, and the distance to the object to be measured may be calculated by measuring the time it takes for the ultrasonic waves to be reflected from the object to be measured and returned. In general, the formula for calculating the distance is as follows:

$$L = 0.5 \times \Delta t \times V$$

Here, L represents the distance from the ultrasonic sensor to the object to be measured, $\Delta t$ represents the time it takes for the sound waves emitted by the ultrasonic sensor to be reflected and received, and V represents the speed of the ultrasonic waves.

In the case of a conventional distance measurement system using an ultrasonic sensor, the value of signal that hits an object and returns is compared with a set threshold, and the signal value is recognized as a valid value only when it exceeds the threshold. However, the problem with this method is that the signal value may intermittently exceed the threshold depending on the surrounding environment noise and its own noise environment, and thus there is an inherent possibility of system errors such as false detection.

DISCLOSURE

Technical Problem

The present disclosure has been made keeping in mind the problems occurring in the related art. An objective of the present disclosure is to provide a distance measurement system capable of extracting significantly improved reliable distance values compared to existing modes of distance detection.

Objectives of the present disclosure is not limited to the objective mentioned above, and other objectives not mentioned will be clearly understood by those skilled in the art from the description below.

Technical Solution

In order to achieve the above mentioned objective, according to an embodiment of the present disclosure, there is provided a distance measurement system including: a sensor unit for generating and transmitting a signal and receiving a reflected signal reflected back from an object; a buffer for temporarily storing data; and a control unit which calculates the distance to the object by measuring the time from when the signal is transmitted from the sensor unit to when the reflected signal is received.

The control unit may calculate a distance value by recognizing a value of the reflected signal received by the sensor unit as a valid value only when the reflected signal value exceeds a preset first threshold, store the calculated distance value in the buffer but calculate the distance value as many as N preset frames before storing the calculated distance values by N preset frames in the buffer, calculate an average value of the distance values stored in the buffer, and determine the average value as the distance value when the average value falls within a predetermined error range.

The error range may be set by a user.

The control unit may calculate an average value of distance values only for signal values measured in some of entire measurement ranges of the sensor unit.

The control unit may adjust the threshold to a value lowered by a predetermined amount when a sensitivity level of the reflected signal received by the sensor unit is lower than a predetermined reference value.

The control unit may provide a hold function for retaining the determined distance value for a time period set by a user.

The control unit may calculate a moving average of distance values, and, when a value of the moving average exceeds a preset second threshold, determine the value as a valid value and an invalid value otherwise.

Advantageous Effects

According to a distance measurement system of the present disclosure, by using an algorithm combining probability and moving average, the reliability of distance measurement can be significantly improved compared to existing modes of distance detection.

BEST MODE

The present disclosure relates to a distance measurement system including: a sensor unit for generating and transmitting a signal and receiving a reflected signal reflected back from an object; a buffer for temporarily storing data; and a control unit which calculates the distance to the object by measuring the time from when the signal is transmitted from the sensor unit to when the reflected signal is received.

Mode for Invention

Advantages and characteristics of the embodiments disclosed in this specification, and methods for achieving them will become clear with reference to the embodiments described later in conjunction with the accompanying drawings. However, the embodiments proposed in the present disclosure are not limited to the embodiments disclosed below and may be implemented in various different forms, and these embodiments are only provided to completely inform those skilled in the art of the scope of the embodiments.

The terms used herein will be briefly described, and the disclosed embodiments will be described in detail.

Although the terms used in this specification have been selected from general terms that are currently widely used as much as possible while considering the functions of the disclosed embodiments, they may vary depending on the intention or precedent of a person working in the related field, the emergence of new technologies, and the like. In addition, in certain cases, there are also terms arbitrarily selected by the applicant, and in this case, their meanings will be described in detail in the detailed description of the relevant specification. Therefore, the terms used herein should be defined based on the meaning of the terms and the overall content of this specification, not defined by just the names of the terms.

Expressions in the singular number in this specification include plural expressions unless the context clearly dictates that the expression is singular.

Throughout the specification, when a part is said to "include (comprise)" a certain component, it means that it may further include (comprise) other components, not excluding other components unless otherwise stated. In addition, the term "unit (part)" used in the specification means a hardware component such as software, FPGA or ASIC, and "unit (part)" performs certain roles. However, "unit (part)" is not meant to be limited to software or hardware. A "unit (part)" may be configured to reside in an addressable storage medium and may be configured to reproduce on one or more processors. Therefore, as an example, "unit (part)" includes components such as software components, object-oriented software components, class components, and task components, and processes, functions, properties, procedures, subroutines, segments of program code, drivers, firmware, microcode, circuits, data, databases, data structures, tables, arrays, and variables. Functionality provided within components and "units (parts)" may be combined into fewer components and "units (parts)" or further separated into additional components and "units (parts)".

In addition, in the description with reference to the accompanying drawings, the same reference numerals are given to the same components regardless of reference numerals, and overlapping descriptions thereof will be omitted. In describing the present disclosure, when it is determined that a detailed description of a related known technology may unnecessarily obscure the subject matter of the present disclosure, the detailed description thereof will be omitted.

Figure 2:
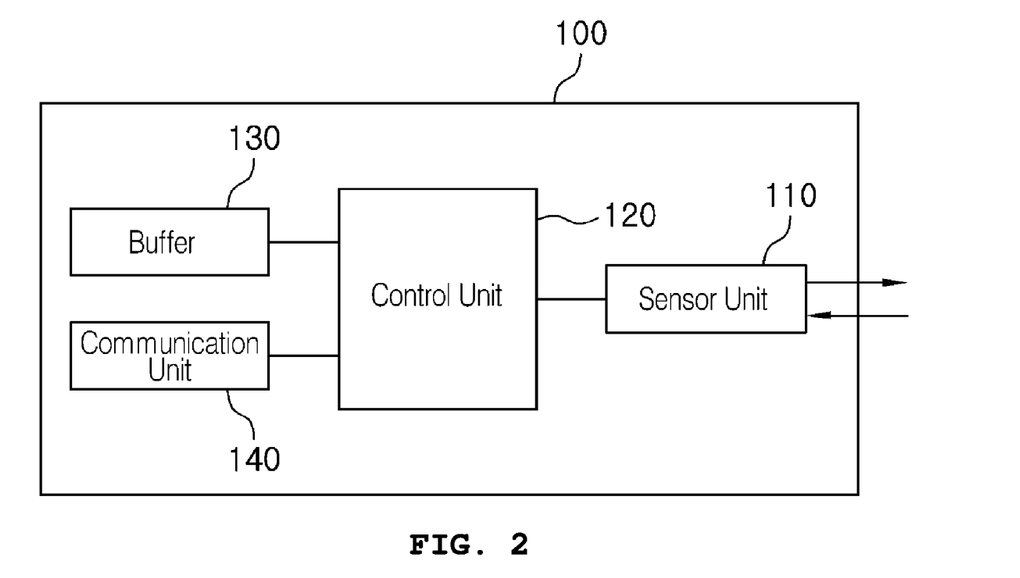
FIG. 2 is a block diagram illustrating the configuration of a distance measurement system according to an embodiment of the present disclosure.

FIG. 2 is a block diagram illustrating the configuration of a distance measurement system according to an embodiment of the present disclosure; and FIGS. 3 to 7 are flowcharts illustrating a detailed distance measuring method in the distance measurement system according to the embodiment of the present disclosure.

Referring to FIGS. 2 to 7, the distance measurement system according to the present disclosure includes: a sensor unit 110, a control unit 120; a buffer 130, and a communication unit 140.

The sensor unit 110 generates and transmits a signal and receives a reflected signal reflected back from an object. In an embodiment of the present disclosure, the sensor unit 110 may be implemented as an ultrasonic sensor or the like.

The control unit 120 calculates the distance to the object by measuring the time from when the signal is transmitted from the sensor unit to when the reflected signal is received.

The buffer 130 temporarily stores data.

The communication unit 140 serves to communicate with an external device through a wired or wireless communication network. For example, it is possible to communicate with an alarm device displaying an alarm on the user side through the communication unit 140. In this case, when an object is detected by the distance measurement system, this signal is transmitted to the user's alarm device through the communication unit 140, and an alarm may be displayed while the alarm device is turned on.

In the present disclosure, the control unit 120 calculates a distance value by recognizing a value of the reflected signal received by the sensor unit 110 as a valid value only when the reflected signal value exceeds a preset first threshold, stores the calculated distance value in the buffer 130 but calculates distance value as many as N preset frames before storing the calculated distance values by N preset frames in the buffer 130, calculates an average value of the distance values stored in the buffer 130, and determines the average value as the distance value when the average value falls within a predetermined error range.

In the present disclosure, the first threshold may be set by various experiments. For example, the first threshold may be set to a detectable point based on a 75 mm PVC pipe by experimentation.

Figure 3:
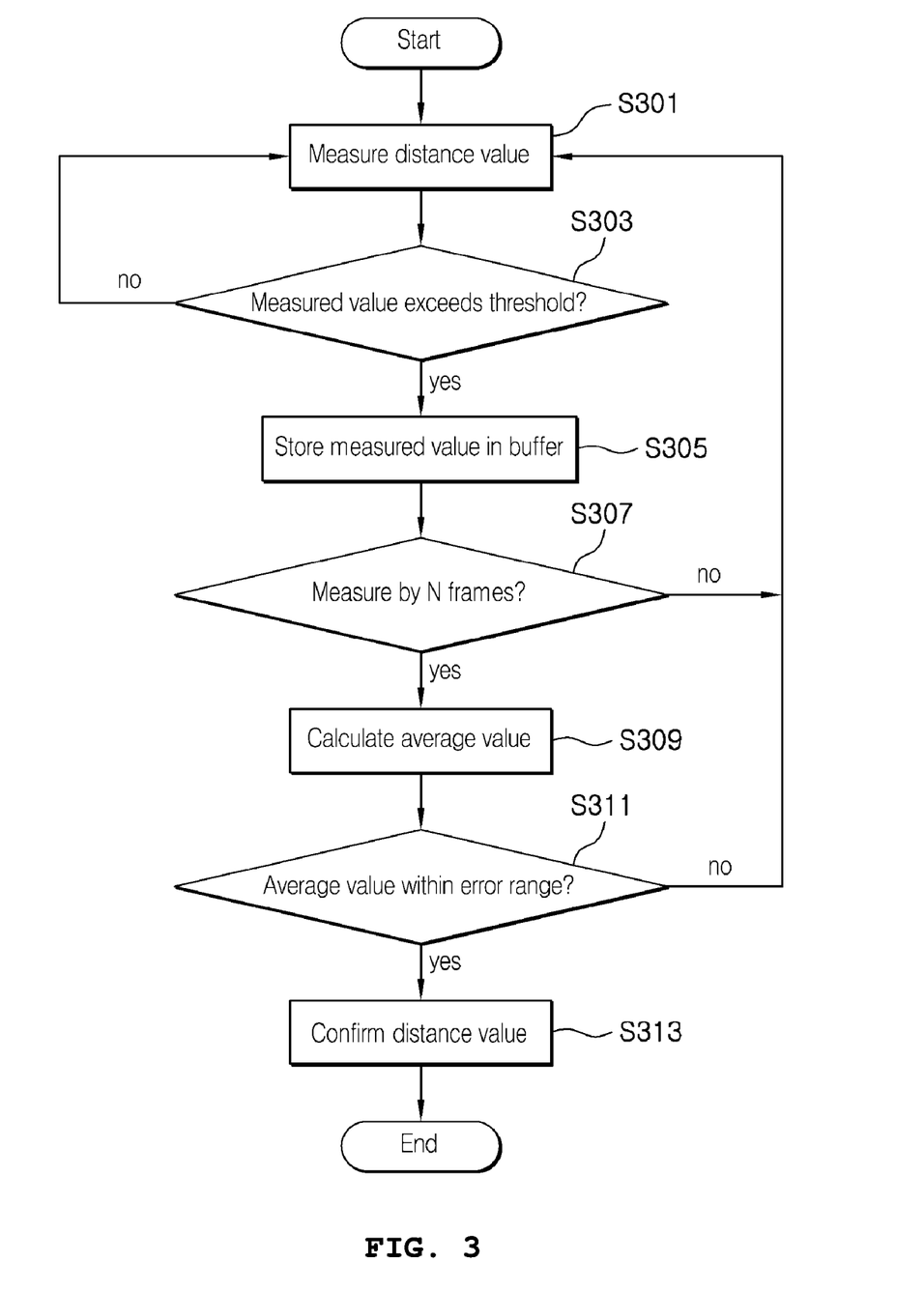
FIGS. 3 to 7 are flowcharts illustrating a detailed distance measuring method in the distance measurement system according to the embodiment of the present disclosure.

Referring to FIG. 3, the control unit 120 calculates a distance value only when the reflected signal value received by the sensor unit 110 exceeds the first threshold (S301 and S303), and stores the measured distance value in the buffer 130 (S305).

In addition, the control unit 120 calculates distance values as many as N frames, stores the calculated distance values in the buffer 130, and calculates an average value of the distance values stored in the buffer 130 (S307, S309).

When the average value falls within the error range (S311), the control unit 120 determines the average value as a distance value (S313).

In the embodiment of the present disclosure, the error range may be set by a user.

Figure 4:
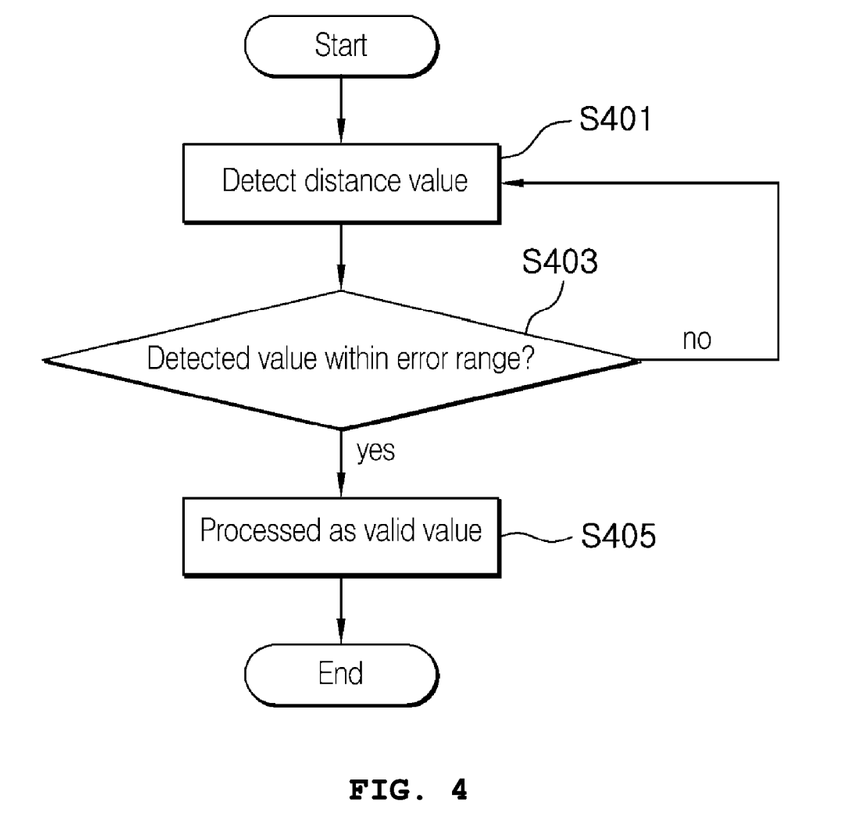

Referring to FIG. 4, when the detected distance value falls within the error range (S401, S403), the control unit 120 processes it as a valid value.

As such, in the present disclosure, a function for the user to arbitrarily adjust the error range is provided, so that when the distance value falls within the error range, it can be recognized as a valid value.

In the embodiment of the present disclosure, the control unit 120 may calculate an average value of distance values only for signal values measured in some of the entire measurement ranges of the sensor unit 110.

A function of adjusting the range by specifying a range for calculating the average value within the measurement range (min-max) of the sensor unit 110 is proposed. In the embodiment of the present disclosure, a section where noise occurs more than a predetermined frequency is specified, and the average value of the distance values is calculated only in the specified section while in the remaining section, when the reflected signal value from the sensor unit 110 exceeds the threshold, it is recognized as valid and the distance value is calculated immediately.

For example, when the entire detectable measurement range of the sensor unit 110 is 15 to 600 cm, the validity of the detected value is determined by calculating the average of only the distance values in the specific measurement range of 500 to 600 cm, and in the remaining section of 15 to 500 cm, when the reflected signal value exceeds the set threshold once, it is recognized as a valid value.

Figure 5:
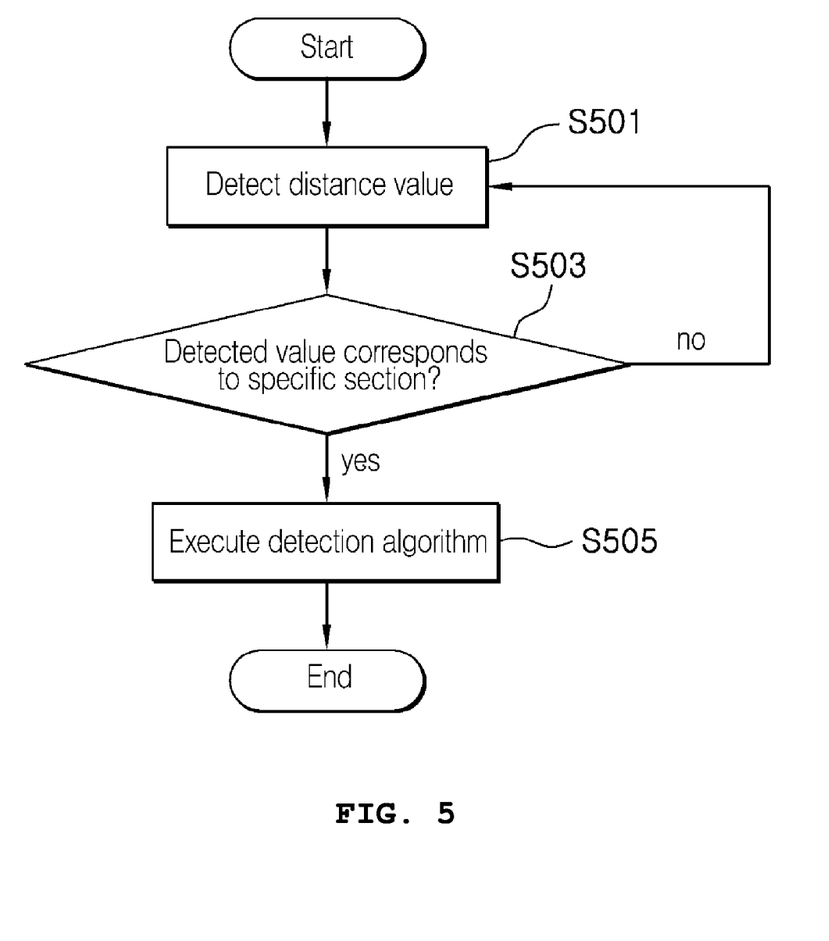

Referring to FIG. 5, when the detected distance value corresponds to a specific section (S501, S503), the control unit 120 executes a detection algorithm for obtaining an average value (S505).

In the embodiment of the present disclosure, when a sensitivity level of the reflected signal received by the sensor unit 110 is lower than a predetermined reference value, the control unit 120 may adjust the threshold to a value lowered by a predetermined amount. This is a function that automatically lowers the threshold when the sensitivity level of the reflected signal is low.

For example, when the number of detections of a signal exceeding a threshold during a predetermined cycle is less than or equal to the reference value, it is determined that the sensitivity level of the signal is low, and the threshold of the section in which the corresponding signal is detected is lowered by a predetermined amount for a certain period of time. For example, assuming that the reference value is 2 out of 5 signal detection attempts, when the number of detections of a signal exceeding the threshold is 1 out of 5 signal detection attempts, the threshold is lowered by a predetermined amount.

In this way, even when the signal sensitivity level is low, the validity of the signal may be determined by checking the frequency of occurrence of the signal exceeding the threshold at the same object point.

In the embodiment of the present disclosure, the control unit 120 may provide a hold function for retaining the determined distance value for a time period set by the user.

For example, when signal detection for a long-distance object occurs 3 out of 5 times, a situation in which the alarm is turned off and turned on repeatedly by the signal detected by the user's alarm device may occur. Thus, by providing a hold function to retain the detection value for a certain period of time set by the user, turning on/off of the alarm is prevented. In addition, when there is no signal detection for a certain period of time while the hold function is operating, the hold function may be initialized.

Figure 6:
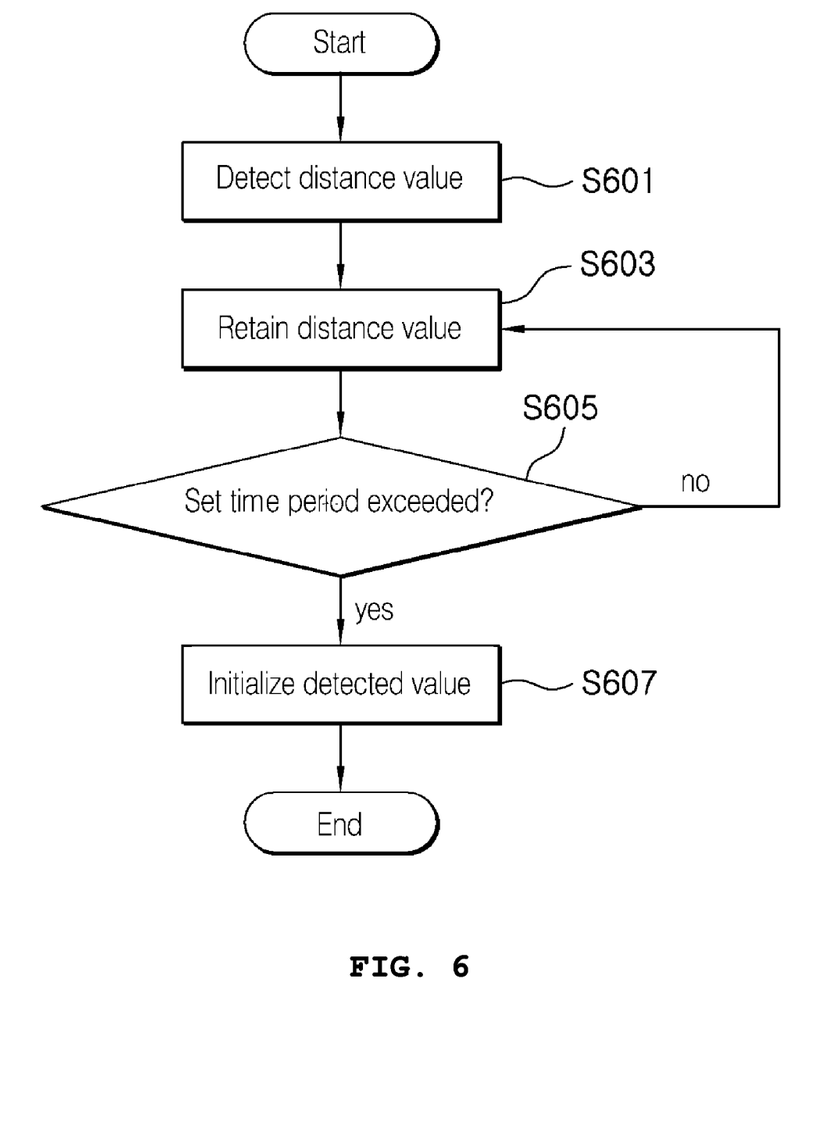

Referring to FIG. 6, while the hold function is maintained, the determined distance value is retained even if a new distance value is detected (S601 to S605), and when the set time period of the hold function is exceeded, the determined distance value is initialized (S607).

In the embodiment of the present disclosure, the control unit 120 may calculate a moving average of the distance values, and, when a value of the moving average exceeds a preset second threshold, determine the value as a valid value and an invalid value otherwise.

This function applies the detected distance value to N buffers such as dist[N]. In addition, when N buffers are filled with N data to be updated, the oldest data is discarded and new data is continuously filled into N buffers. In this way, the average value for the entire data is calculated, and when the average value exceeds the set second threshold, it is recognized as a valid value.

When an intermittent noise signal is generated due to this function, it may be determined as a noise signal, which is an invalid signal, by using the average of N data.

Since the intermittent noise signal is not detected multiple times for the same distance value, the probability that the average value of the moving average exceeds the threshold is reduced. For example:

1. dist[5]: Assume a threshold of 10 for 5 moving average buffers.
2. Put the data into the moving average buffer for 5 frames.
3. Since (15+10+10+10+10)/5=11, it is recognized as a valid distance value in this case.
4. Since (10+0+0+0+10)/5=4, in this case it is recognized as an intermittent noise signal and is not recognized as a valid value. After the 5th frame, the moving average value is measured every frame and it is determined whether the value divided by N is a valid value.

Figure 7:
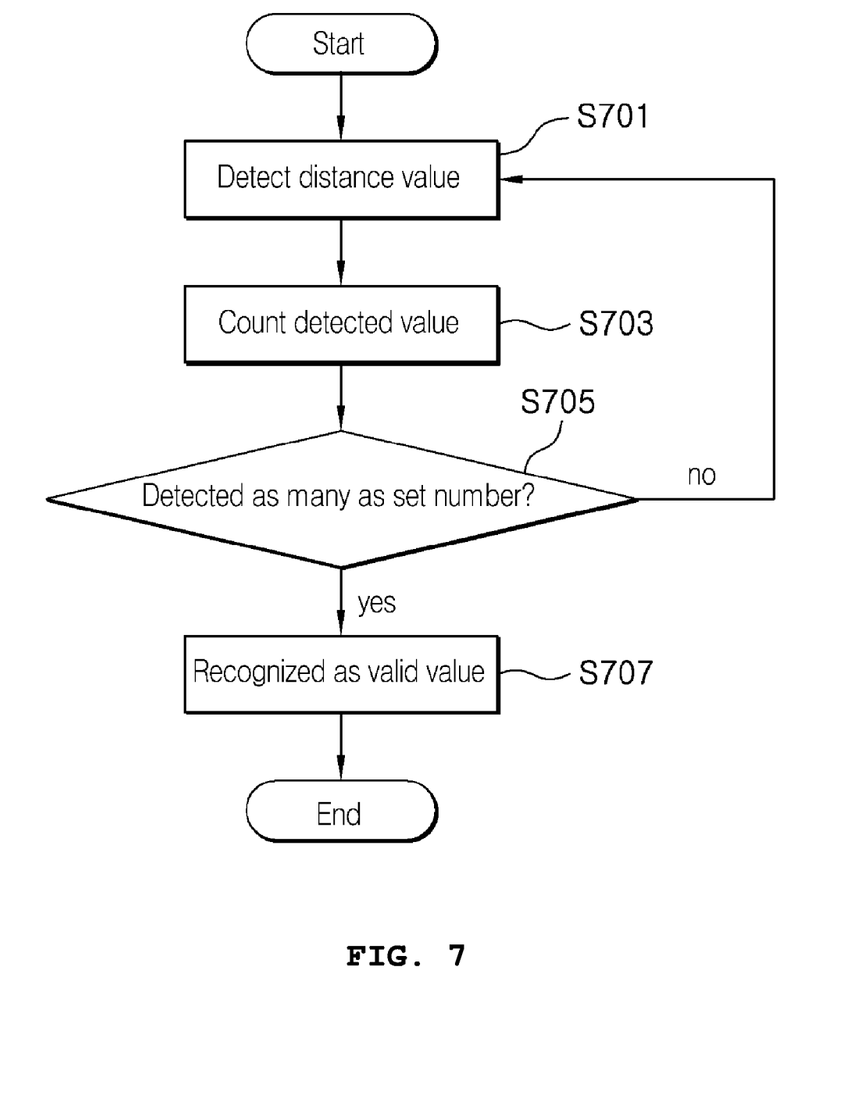

Referring to FIG. 7, a distance value is detected and the detected distance value is counted (S701, S703). When the detected distance value is detected as many as the set number, it is recognized as a valid value (S705, S707).

FIGS. 8 to 11 are screen examples illustrating actual experimental result data of the distance measurement system according to the embodiment of the present disclosure.

Figure 8:
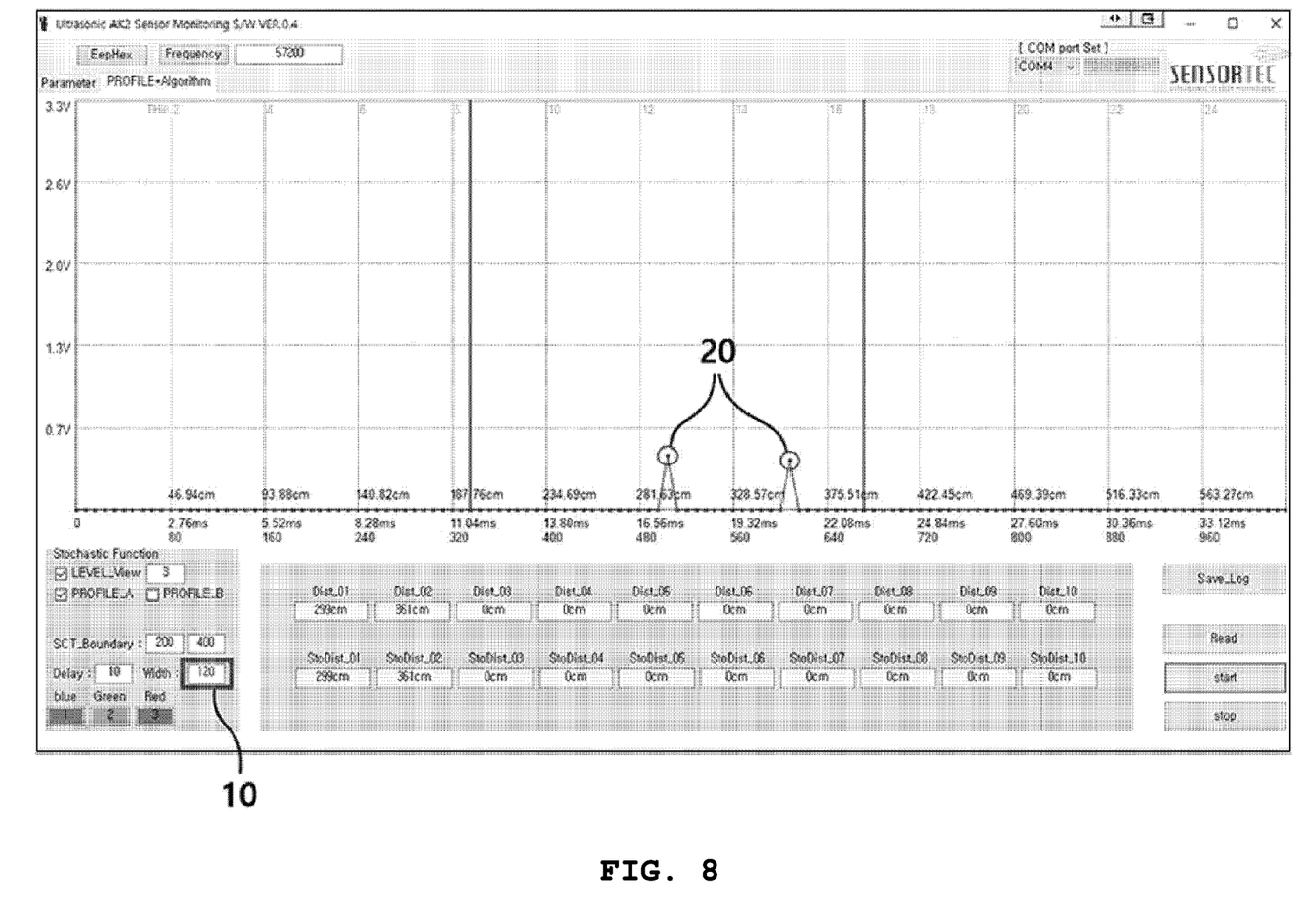
FIGS. 8 to 11 are screen examples illustrating actual experimental result data of the distance measurement system according to the embodiment of the present disclosure.

Referring to FIG. 8, the error range may be set in a red box 10 at the bottom left. FIG. 8 shows an example in which the error range is set to 120, and when the error of the detected value is ±1.2 cm, it is recognized as the same distance value.

In FIG. 8, when a distance value is detected three or more times consecutively within the error range, the corresponding distance values are displayed as a red circle 20, when detected twice in a row, displayed in green, and when detected once, displayed in blue. Setting the error range in this way is to compensate for the case where the value detected at the same distance fluctuates.

Figure 9:
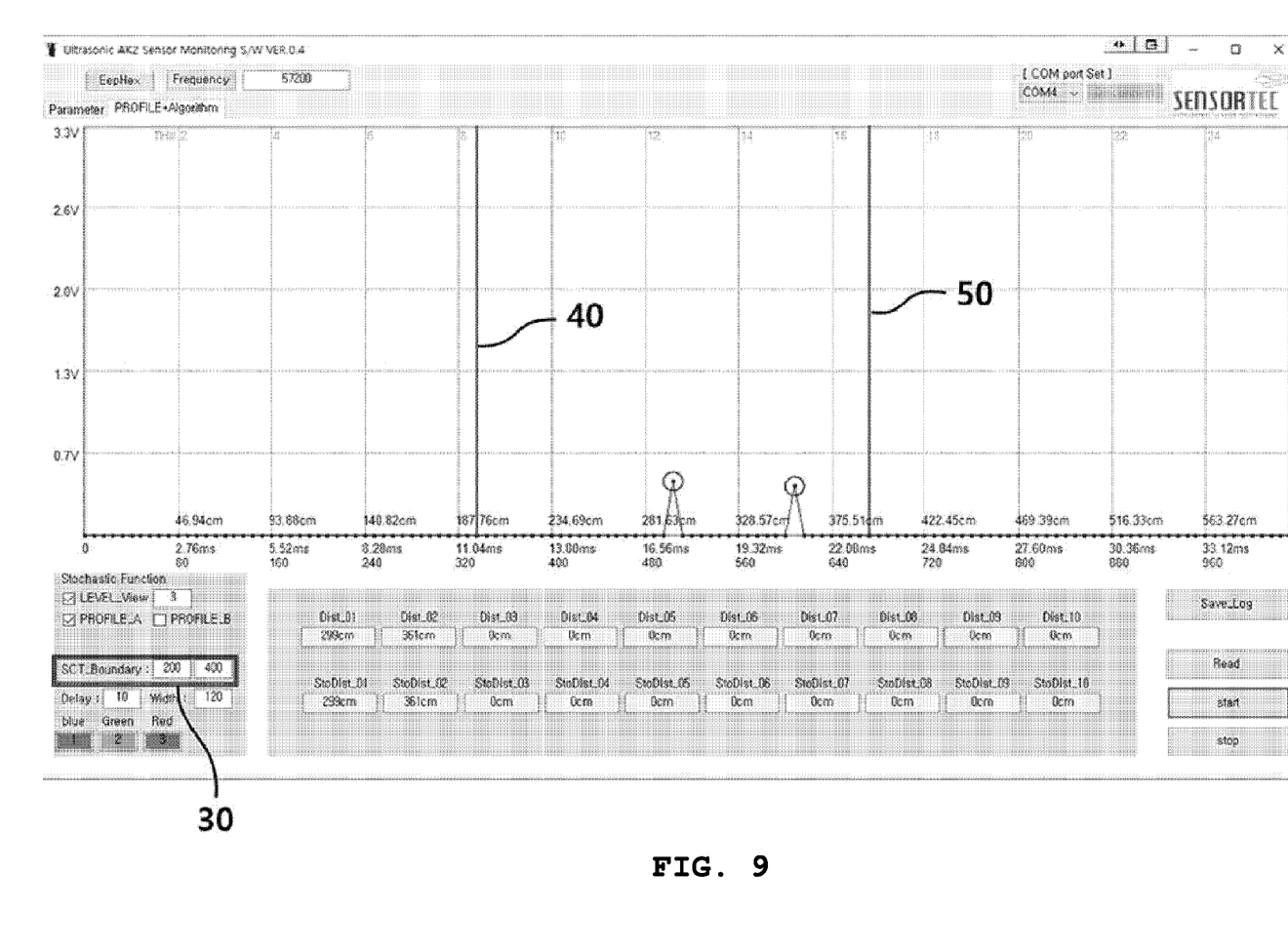

In FIG. 9, when the low and high values of the measurement section are set in a red box 30 at the bottom left, low 40 and high 50 are displayed with a red line in the middle of the graph, and the low-high section is set as a specific detection section. When a specific detection section is set in this way, the distance measurement algorithm of the present disclosure operates only within the set section. In FIG. 9, low is set to 200 and high is set to 400.

Figure 10:
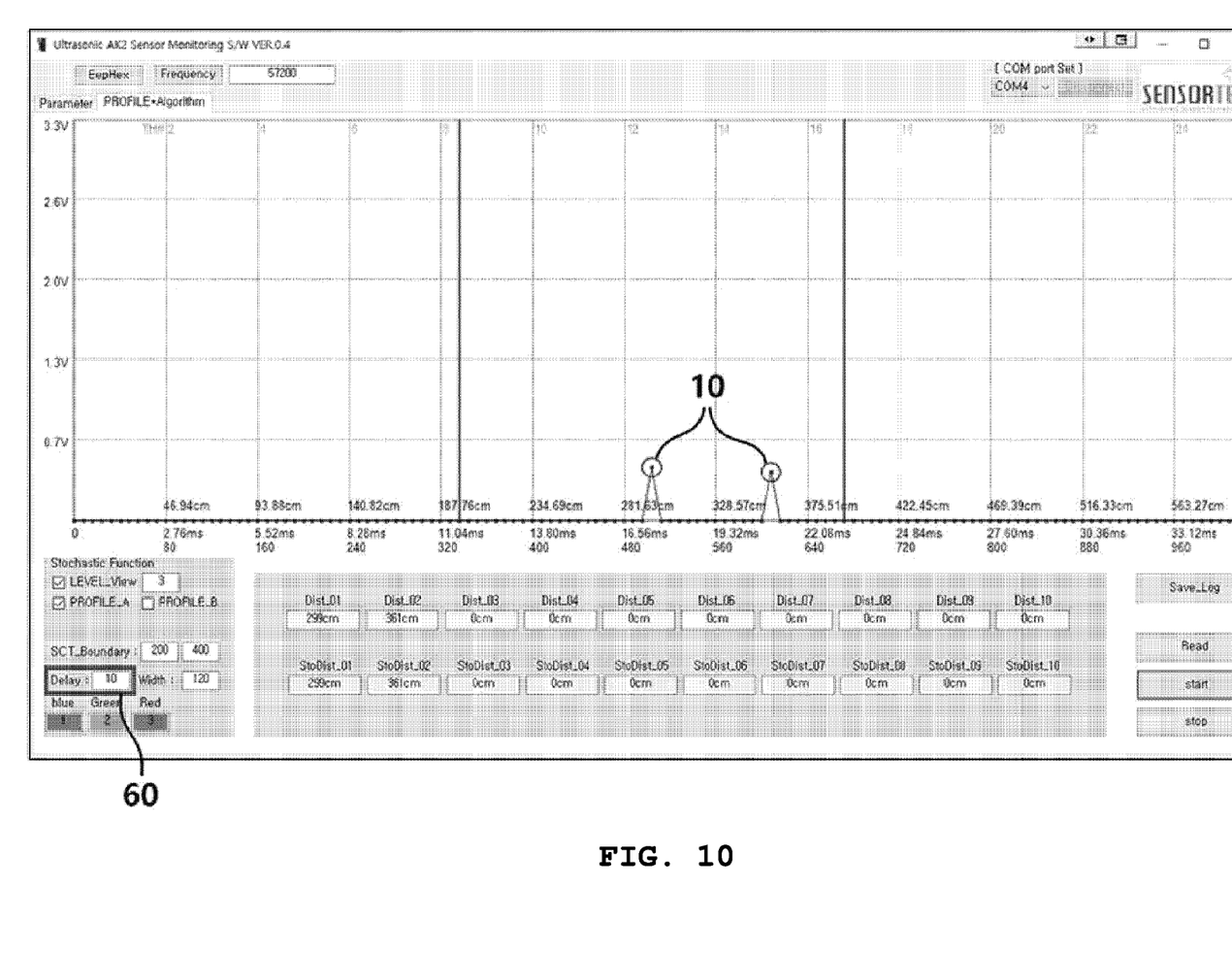

In FIG. 10, when the parameter is adjusted in a red box (Delay) 60 at the bottom left, the distance values indicated by the red circle 10 in the middle are retained for a certain period of time. At this time, the hold time for retaining the distance values may be arbitrarily adjusted by the user. In the example of FIG. 10, the delay 60 parameter is set to 10.

Figure 11:
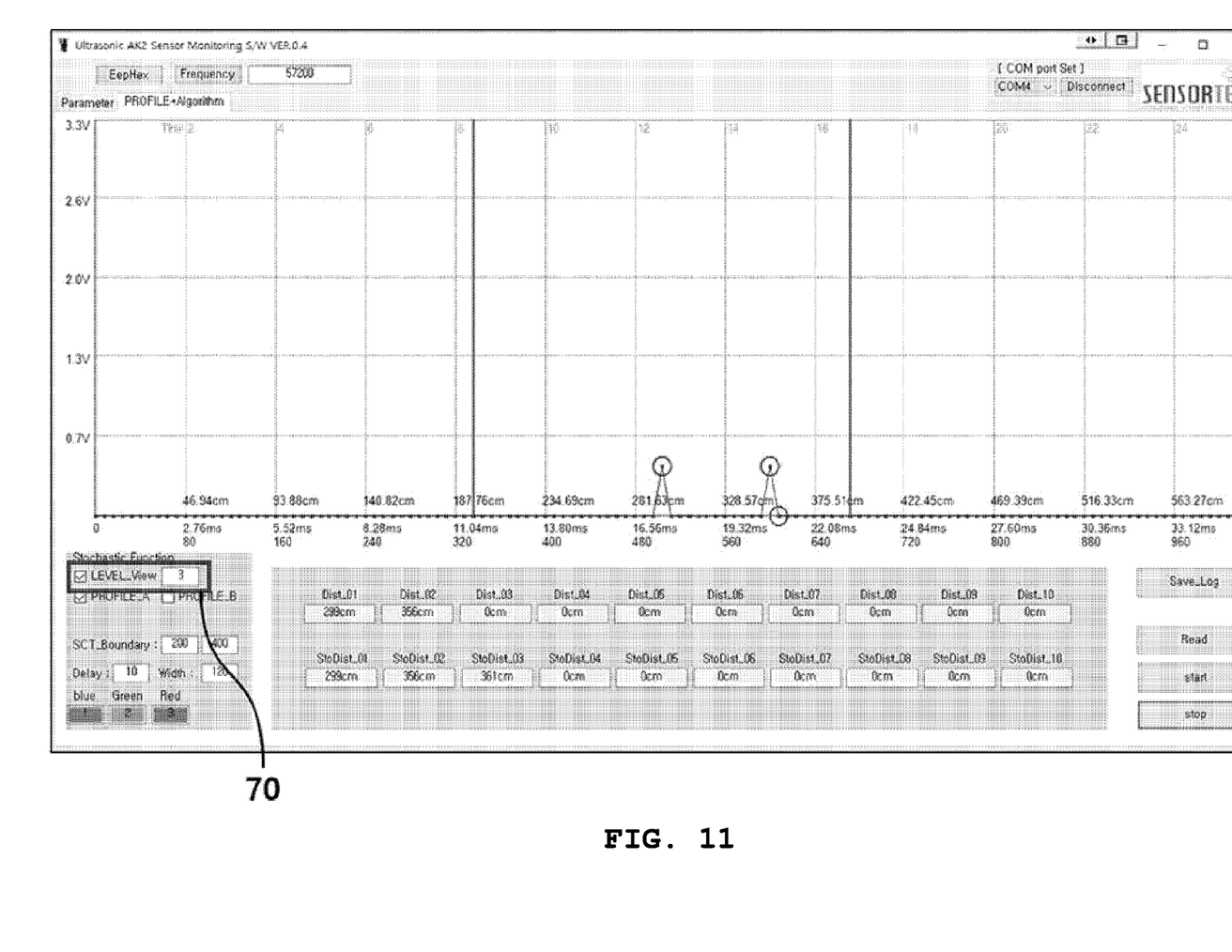

In FIG. 11, when the parameter in a red box (LEVEL_View) 70 at the bottom left is set, a detection value is determined as a valid detection value only when the set number of parameter values are detected during the set time. In FIG. 11, the parameter in the red box (LEVEL_View) 70 is set to 3.

Although the present disclosure has been described above using several preferred embodiments, these embodiments are illustrative and not limiting. Those skilled in the art to which the present disclosure pertains will understand that various changes and modifications can be made without departing from the spirit of the present disclosure and the scope of rights set forth in the appended claims.

The invention claimed is:

1. A distance measurement system, comprising:
   a sensor unit configured to generate and transmit a signal and receive a reflected signal reflected back from an object;
   a buffer configured to temporarily store data; and
   a control unit configured to calculate a distance to the object by measuring a time interval from a time the signal is transmitted from the sensor unit to a time the reflected signal is received,
   wherein the control unit calculates a distance value by recognizing a value of level of the reflected signal received by the sensor unit as a valid value only when the value of level of the reflected signal exceeds a preset first threshold, stores the calculated distance value in the buffer but calculates the distance value as many as N preset frames before storing the calculated distance values by N preset frames in the buffer, calculates an average value of the distance values stored in the buffer, and determines the average value as the distance value when the average value falls within a predetermined error range, and wherein the control unit lowers the preset first threshold by a predetermined amount when the value of level of the reflected signal received by the sensor unit is lower than a predetermined reference value.

2. The distance measurement system of claim 1, wherein the predetermined error range may be set by a user.

3. The distance measurement system of claim 1, wherein the control unit calculates the average value of distance values only for signal values measured in some of entire measurement ranges of the sensor unit.

4. The distance measurement system of claim 1, wherein the control unit provides a hold function for retaining the determined distance value for a time period set by a user.

5. The distance measurement system of claim 1, wherein the control unit calculates a moving average of distance values, and, when a value of the moving average exceeds a preset second threshold, determines the value as a valid value and an invalid value otherwise.

\* \* \* \* \*